United States Patent [19]
Peterson

[11] 3,892,647
[45] July 1, 1975

[54] METHOD OF ELECTRODEPOSITING A POLYMER

[75] Inventor: Marvin A. Peterson, Fort Wayne, Ind.

[73] Assignee: General Electric Company, Fort Wayne, Ind.

[22] Filed: Sept. 1, 1972

[21] Appl. No.: 285,612

Related U.S. Application Data

[62] Division of Ser. No. 18,816, March 12, 1970, abandoned.

[52] U.S. Cl. ............................................. 204/181
[51] Int. Cl. ............................................. B01k 5/02
[58] Field of Search ................................. 204/181

[56] References Cited
UNITED STATES PATENTS
3,507,765  4/1970  Holub .............................. 204/181
3,663,728  5/1972  Hoback et al. ................... 204/181

OTHER PUBLICATIONS
Hagan, Journal of Paint Technology, Vol. 38, (Aug. 1966), No. 499, pages 436–439.

Primary Examiner—Howard S. Williams

[57] ABSTRACT

An electrodeposition process for depositing a polymer coating on an electrically conductive substrate. A polymer, such as a polyamide acid, is formed in a water-miscible organic solvent and then reacted with ammonium hydroxide to form a water soluble polymer. An aqueous-organic solution of the polymer is acidified with a relatively weak volatile acid to render insoluble a portion of soluble polymer. As the pH is adjusted from basic to acidic, the polymer is gradually precipitated from solution to form a dispersion. The ratio of solution phase to dispersion phase of the polymer determines the thickness of a coating produced upon a metal substrate by passing an electric current through the dispersion to electrodeposit the polymer upon the metal substrate. The thickness of the electrodeposited polymer coating on a substrate is variable as a function of the pH or the ratio of the moles of ammonium to carboxyl groups along the polymer chain.

23 Claims, 4 Drawing Figures

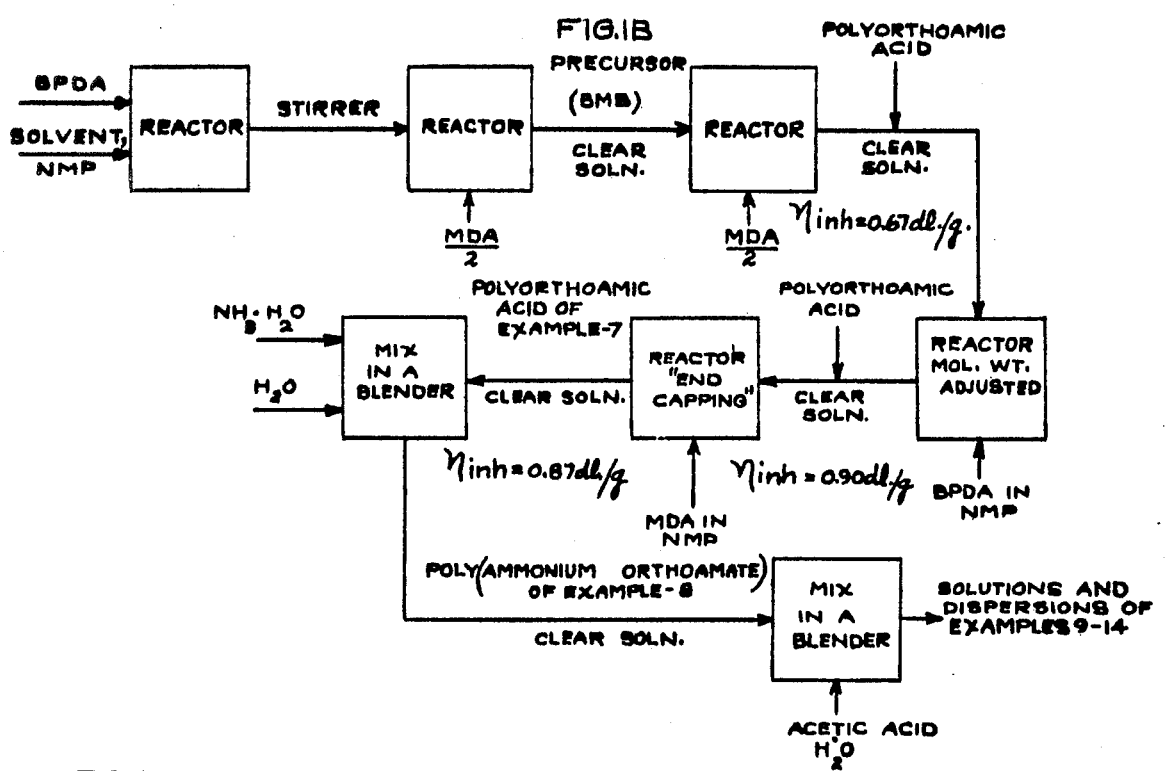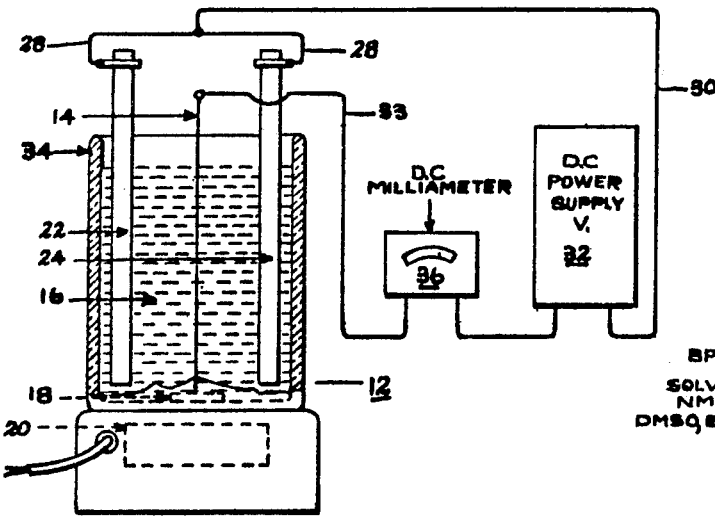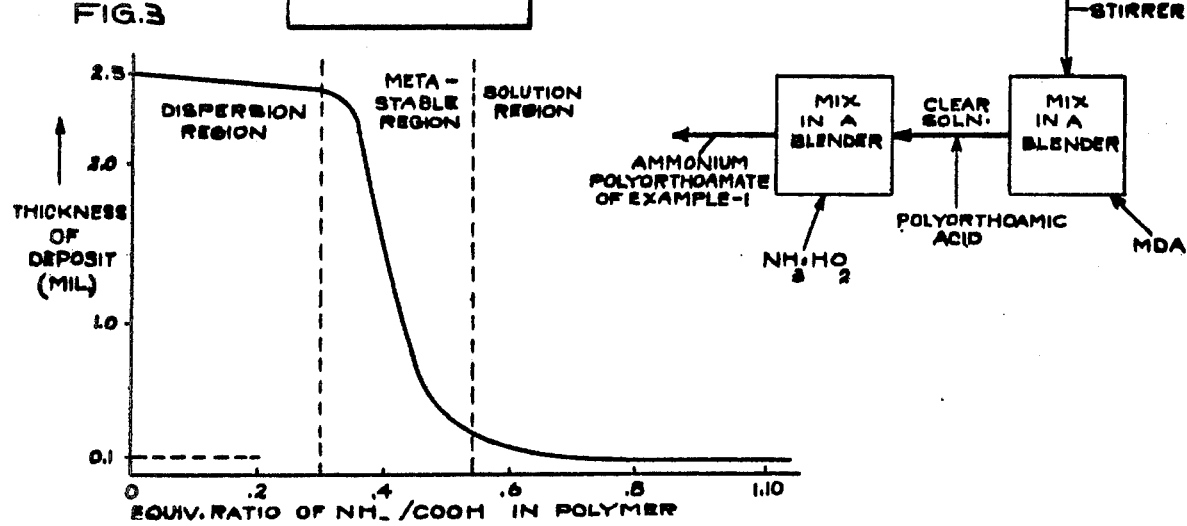

METHOD OF ELECTRODEPOSITING A POLYMER

CROSS REFERENCE TO RELATED APPLICATION

This is a division of U.S. Pat. application Ser. No. 18,816, filed Mar. 12, 1970, now abandoned.

BACKGROUND OF THE INVENTION

While it has proven possible to electrodeposit relatively thin films of resinous materials from aqueous solutions, it has not been possible to secure a desired range in film build-up for a given polymer on a particular substrate. In particular it has proven beyond the ability of the art to produce a controllable, gradual increase in thickness of electrodeposited film build-up and to achieve a precise consistency in the properties in the polymeric film. For most applications, particularly where multiple coatings must be used to obtain a desired film build, the film deposit is achieved by a coating procedure in which were or other material is passed through a solution, then possibly through dies, a drying tower and for each successive build successive passages are made through the solution and eventually the drying tower. This is an elaborate and time consuming process and if the coating procedure described could be replaced by electrodeposition, considerable economies are possible, as for example, those resulting from the elimination of a drying tower which is a large structure to house and expensive to operate and maintain. Also, there are inherent limitations with respect to solution type coating in that only a relatively small amount of coating material can be deposited with uniform thickness on the article as it passes through a typical dip and drain solution known to the coating art. If electrodeposition is to become a meaningful practice in the art, and especially a meaningful practice in the art for effecting insulation coatings on such components as magnet wire and the like, the formulator must have available a wide range of acceptable resins, a relatively consistently attained narrow range of molecular weight produce per relative site at the time of deposition on the conductor or other substrate, and the formulator must further have available the ability to vary the thickness of electrodeposited films ranging from thin to thick film build-ups.

OBJECTS OF THE INVENTION

The principal object of the present invention is to provide an improved process for preparing an electrodepositable polymer medium which is capable of depositing a polymer film upon a conductive substrate, in a uniform prefetermined thickness.

A further object of the present invention is to provide a process of the foregoing character which makes possible the electro-deposition of polymer coatings which are thicker than were heretofore obtainable in the art.

Another object of the invention is to produce an improved preparation of electrodepositable resin material which forms a dispersion within an organic solvent-water system, and wherein the electrodeposition is derived primarily from the dispersed phase.

Other objects and features of the present invention will become apparent from a consideration of the following description which proceeds with reference to the accompanying drawings.

SUMMARY OF THE INVENTION

In fulfillment of the foregoing objects, it has unexpectedly been found that a polymer solution, capable of producing a thin electrodeposited film, could be converted into a dispersion or partial dispersion by introducing an acid, and then this dispersion could be electrodeposited to yield a relatively thicker film without affecting the properties of the polymer in the ultimately cured state. Furthermore, it has been found that, by controlling the pH of the polymer medium, the desired film buildup could be preselected for a given polymer, ranging from a thin film producible from a polymer solution, that is from a fully solubilized polymer, to a relatively thicker film producible from a polymer dispersion, with intermediate film thicknesses achievable depending upon the ratio of polymer solution to polymer dispersion. The relatively thicker film buildup has been achieved without affecting the properties known for the polymer after cure.

This discovery has been achieved for a variety of polymeric substances although it finds particular, but not necessarily exclusive, utility in connection with aqueous solutions of polyimide prepolymers, such as prepolymers of the type produced by reacting an aromatic dianhydride and an aromatic diamine in a water-miscible organic solvent. The polyimide prepolymer, generally a polyamic acid material, is solubilized by the addition of a volatile ammoniating agent to produce a water soluble ammonium carboxylate salt of the polymer, such as an ammonium polyorthamate. The organic solution of the polymer is mixed with water to form an aqueous-organic polymer solution. The pH of the system is then adjusted by the addition of a relatively weak volatile acid such as formic acid, acetic acid or the like in an amount sufficient to precipitate the polyimide prepolymer as a dispersion. By controlling the amount of acid added, the ratio of solution phase to dispersion phase of the polymer can be controlled. It has been discovered that the precipitation of the polymer as a stable dispersion phase is the controlling criteria with respect to the thickness of a film which can be electrodeposited on a conductive substrate when an electric current is passed from a cathode, through the electro-depositable medium, to the substrate as an anode.

DRAWING

FIG. 1 is a block flow diagram illustrating one illustrative procedure for forming an electrodepositable polymer medium;

FIG. 1a is a second block diagram illustrating the procedures for forming the polymer medium by an alternate procedure;

FIG. 2 is a schematic diagram of an illustrative electrodeposition apparatus for use with the electrodepositable polymer medium embodying the present ammoniating and FIG. 3 is a graph illustrating Film Thickness vs. The Ratio of $NH_3/COOH$ In The Polymer.

GENERAL DESCRIPTION OF THE INVENTION

The principles of the present invention are equally applicable to any polymer which includes pendant carboxylic acid groups reactable with a nitrogen base to render the polymer water soluble, including such polymer systems as polyimide prepolymers, acrylics, polyesters, alkyd polymers, epoxy polymers, cellulosic polymers, and oleo resin polymers. In each case, the polymer is formed in, or is soluble in, a water miscible organic solvent and is characterized by recurrent units having reactable carboxylic acid pendant groups. The carboxylic acid groups are reactable with a volatile nitrogen-containing base, such as a volatile ammoniating agent, to render the polymer water soluble. An aqueous solution of the polymer and solvent is then formed, resulting in an aqueous-organic polymer solution. Solutions of this type can and have been utilized for the electrodeposition of a polymer film. As pointed out above, however, the films thus produced are generally quite thin and are of the order of 0.1–0.5 mils.

In accordance with the present invention, the aqueous-organic polymer solution is acidified with a volatile weak acid to precipitate at least a portion of the polymer as a dispersed phase. Utilization of the medium thus produced, which contains the polymer both in the dispersed phase and in solution, for electrodeposition of polymer film results in substantial and unexpected increases in depositable film thicknesses.

A variey of polymers in the form of water soluble ammonium salts have been found to be useful in accordance with the present invention. In general, an aqueous solution of electrodepositable polymers can be utilized to advantage by following the principles of this invention. What is required is that (1) the polymer be prepared in its appropriate synthesis, (2) the polymerization is continued to obtain a polymer of the desired molecular weight; (3) the polymer is rendered soluble by the addition of a volatile ammoniating agent such as ammonium hydroxide or other suitable nitrogen base material; (4) an aqueous-organic solution of the polymer is prepared; (5) a dispersed phase of the polymer is produced by precipitating at least a portion of the polymer from the solution by the addition of a volatile weak organic acid such as acetic acid, formic acid and the like.

I. Polyimide Prepolymers

An electrodepositable polyimide resin is derived from a polyimide prepolymer having the general formula:

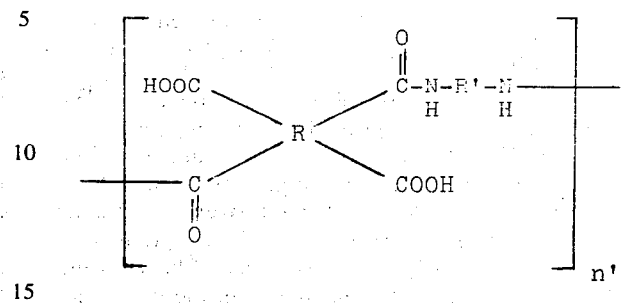

wherein R is an organic tetravalent radical containing at least one ring of 6 carbon atoms and having benzenoid unsaturation, the four carboxyl groups of each unit being attached directly to separate carbon atoms, each pair of carboxyl groups being attached to adjacent carbon atoms in a ring of the radical; and $R'$ is a divalent radical selected from the class consisting of

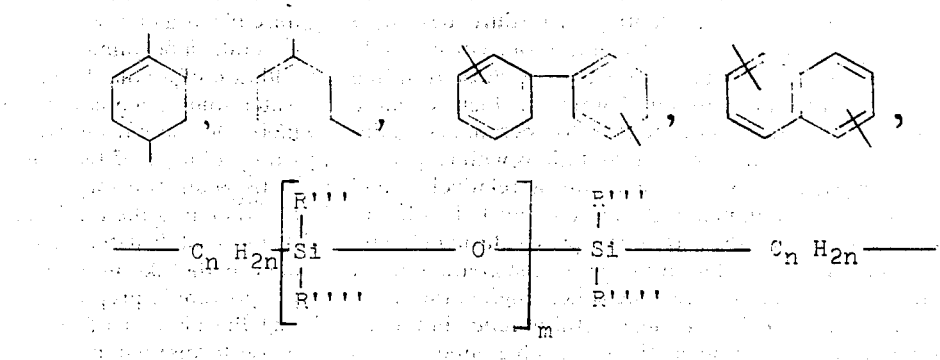

wherein $R'''$ and $R''''$ are an alkyl and an aryl group having 1 to 6 carbon atoms, $n$ is an integer of from 1 to 4 and $m$ has a value of 0, 1 or more, and

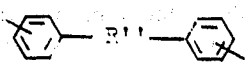

wherein $R''$ is selected from the group consisting of an alkylene chain having 1–3 carbon atoms,

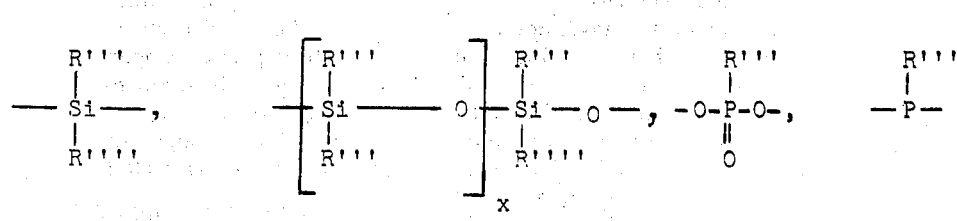

The following illustrative polymers and the ammonium salts thereof are illustrative of the types of polymers which may be utilized in accordance with the present invention. These polymers are set forth in some detail for purposes of illustration and not by way of limitation.

—O—, —S—, —SO₂—, and

wherein R''' and R'''' are as above-defined and x is an integer of at least 0, and wherein n' is an integer of 1 or more.

The prepolymer is then reacted with a volatile nitrogen base ammoniating agent to make it water soluble. The water soluble ammoniated polyimide prepolymer has the general formula:

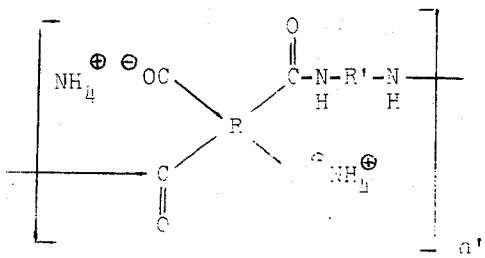

in which n', R and R' are as described above.

One illustrative water soluble polyimide prepolymer is the ammonium salt of the condensation polymer 3,3', 4,4'-benzophenonetetracarboxylic dianhydride and 4,4'-methylene dianiline. This salt has recurrent units of the gneral formula:

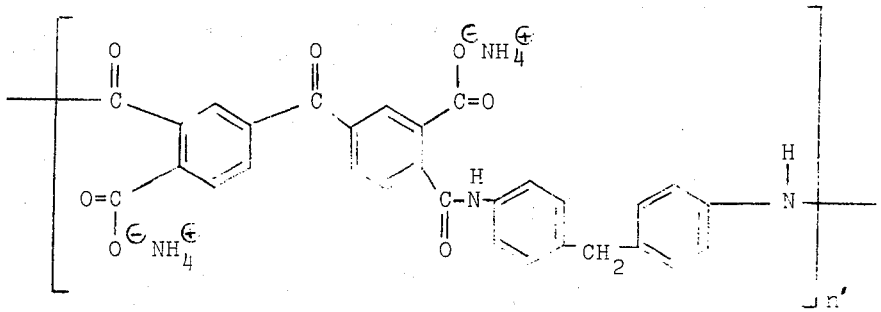

Polyimide type polymers produced from an aromatic dianhydride and an aromatic diamine may be prepared in accordance with the teachings disclosed in copending Application Ser. No. 803,037, filed Feb. 27, 1969, for "IMPROVED PROCESS FOR PRODUCING COATING MATERIALS," assigned to the General Electric Company. In this process, the dianhydride and aromatic diamine are reacted together in an organic solvent to form a prepolymer which is then stabilized by the addition of a volatile nitrogen-containing base such as ammonia or an organic amine. The stabilized prepolymer thus obtained may be partially imidized before full polymerization to selectively control the viscosity of the solution.

Precise control of the polymeric molecular weight is described in Application Ser. No. 822,899 filed May 8, 1969 for "IMPROVED PROCESS FOR PRODUCING WIRE COATINGS FROM PREPOLYMERIC MATERIALS," assigned to The General Electric Company. In this process, the reactants are in the form of an aromatic dianhydride, referred to symbolically as X and an aromatic diamine referred to symbolically as Y. These reactants are reacted together in an anhydrous n-methyl pyrrolidone (NMP) solvent, first in the molar ratio of 2–1 to form precursors XYY or YXY. The precursors are then zipped up or tied together by adding either additional X to the YXY solution or additional Y to the XYX solution.

A further refinement upon the synthesis technique referred to above is that indicated in U.S. Pat. No. 3,663,510, issued May 16, 1972 for "PROCESS FOR PRODUCING POLYAMIDE COATING MATERIALS," assigned to The General Electric Company. In U.S. Pat. No. 3,663,510, the precursor material, which is first formulated in the molar ratio of 2–1 parts of reactants is zipped up with a slight molar ratio excess of one or the other of the reactants and the resulting product is then back-titrated, approaching a 1 to 1 molar ratio of reactants. By this procedure any preselected desirable molecular weight range is obtainable by the back addition of either dianhydride to amine-terminated prepolyimide polymer or by the back addition of aromatic diamine to dianhydride-terminated prepolyimide polymer. The resulting product can then be encapped in the manner described in U.S. Pat. No. 3,652,500 issued Mar. 28, 1971 for "PROCESS FOR PRODUCING POLYAMIDE COATING MATERIALS BY ENDCAPPING" and assigned to the General Electric Company. In both of the above-mentioned patents, reference is made to the use of nitrogen-containing bases to convert the water insoluble polymer to a polyelectrolytic water soluble form. Each of these patents also described in detail the particular organic solvents which may be utilized. To the extent necessary for a complete understanding of the present invention, the disclosures of the above-identified applications and patents are incorporated by reference herein and made a part of this disclosure.

II. Polyester Polymers

An electrodepositable polyester resin is derived from a polymer having the general formula:

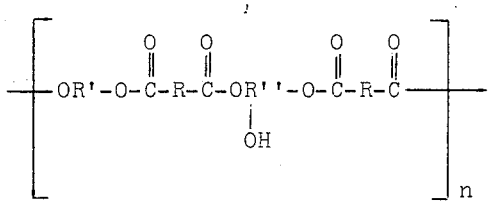

wherein R is selected from (1) —$(CH_2)_n$— where n is preferably within the value range of 2 to 6, (2)

, and (3)

, R' is —(CH$_2$)$_{\overline{n}}$ where n is preferably within the value range of 2 to 6, and R'' is selecetd from (1) —(CH$_2$)$_{\overline{n}}$ where n is preferably within the value range of 3 to 5 with the pendant —OH group attached at any carbon other than the end carbons, and (2) trishydroxyethylisocyanurate to form polymers of low to intermediate molecular weight, or from a polymer having the general formula:

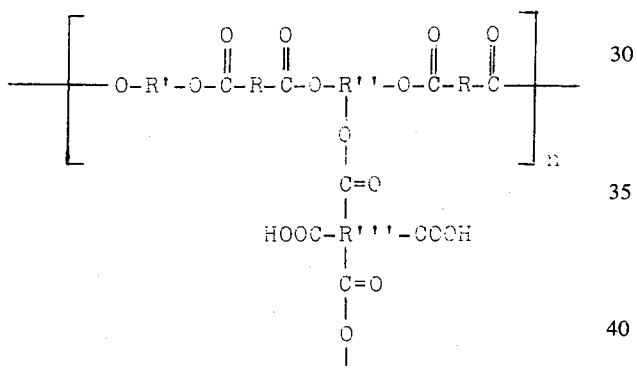

wherein R, R' and R'' are as described above and R''' is an organic tetravalent radical containing at least one ring of six carbon atoms and having benzenoid unsaturation, the four carboxyl groups of each unit being attached directly to separate carbon atoms, each pair of carboxyl groups being attached to adjacent carbon atoms in a ring of the radical, to form cross-linkable polymers. The polymers thus formed are reacted with a volatile nitrogen base to produce a water soluble salt.

Electrodepositable polyester resins are known in the art and in general include recurrent units having carboxylic acid pendant groups which are reactable with a nitrogen base to render the polymer water soluble. One illustrative example of a water soluble polyester polymer is the ammonium salt of the reaction product of ethylene glycol (2 moles), dimethyl terephthlate (3 moles) and glycerine (1 mole). These reagents may also be reacted with tetra-functional pyromellitic dianhydride, the reaction product having recurrent units of the formula:

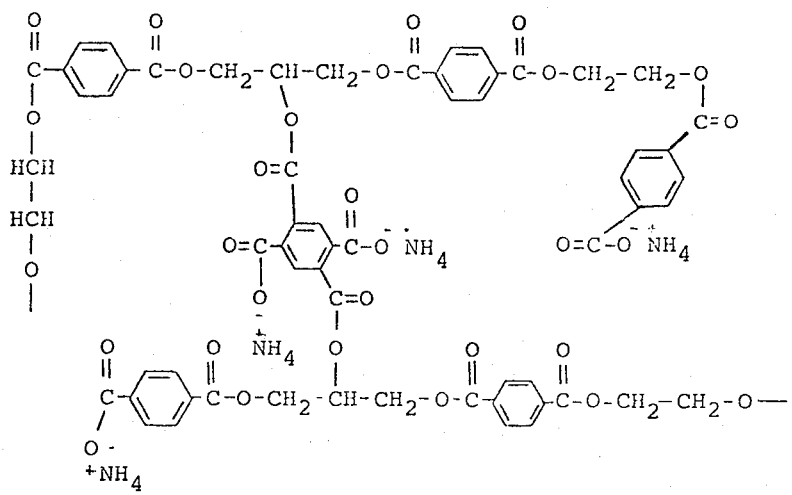

III. Polyesterimide Polymers

An electrodepositable polyesterimide resin is derived from a polyesterimide polymer having the general formula:

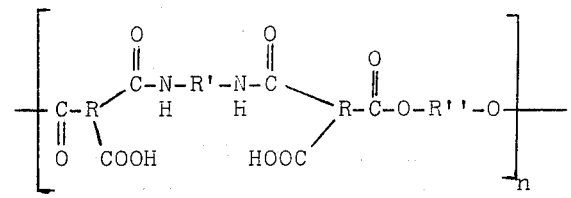

wherein n is an integer of 1 or more, and wherein R is

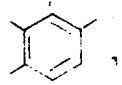

R' is a divalent radical selected from the class consisting of

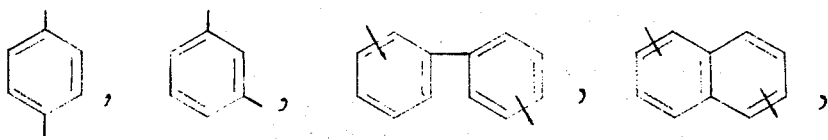

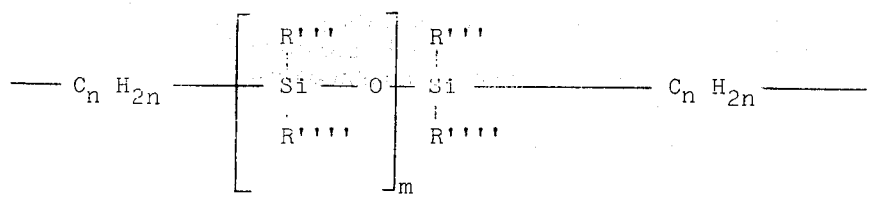

wherein R''' and R'''' are an alkyl or an aryl group having 1 to 6 carbon atoms, $n$ is an integer of from 1 to 4 and m has a value of 0, 1 or more, and

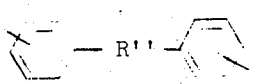

wherein R'' is selected from the group consisting of an alkylene chain having 1-3 carbon atoms,

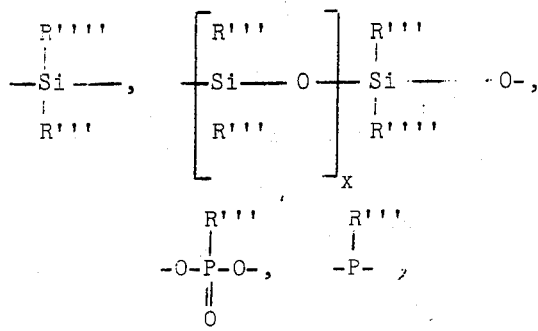

—O—, —S—, —SO$_2$—, and

wherein R''' and R'''' are as above defined and $x$ is an integer of at least 0, and R— is —(CH$_2$)$_n$—where $n$ is preferably within a value range of 2 to 6 to form linear low molecular weight polymers, or a polyesterimide polymer having the general formula:

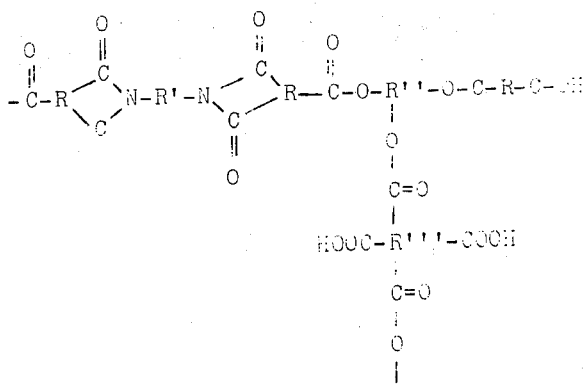

wherein R, R' and R'' are as described above and R''' is an organic tetravalent radical containing at least one ring of six carbon atoms and having benzenoid unsaturation, the four carboxyl groups of each unit being attached directly to separate carbon atoms, each pair of carboxyl groups being attached to adjacent carbon atoms in a ring of the radical, to form low molecular weight crosslinkable polymers. The polymers are then reacted with a nitrogen base to make them water soluble.

For example, one illustrative water-soluble polyesterimide polymer is the ammonium salt of the reaction product of ethylene glycol (2 moles), terephthalic acid (1 mole), reaction product of two moles trimellitic anhydride and one mole of 4,4'-methylene dianiline (2 moles), and trishydroxyethylisocyanurate (1 mole) condensation polymer, reacted with pyromellitic dianhydride to produce a salt having the formula:

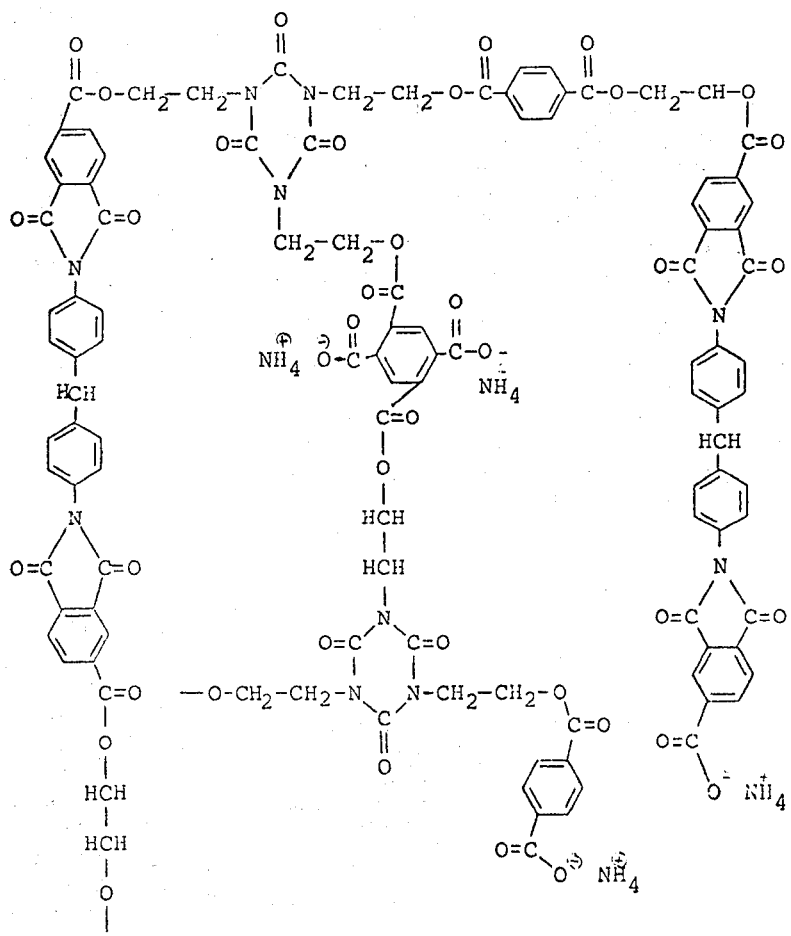

IV. Head to Head Polyacrylic Polymers

An electrodepositable polyacrylic resin is derived from a polyacrylic polymer having the general formula:

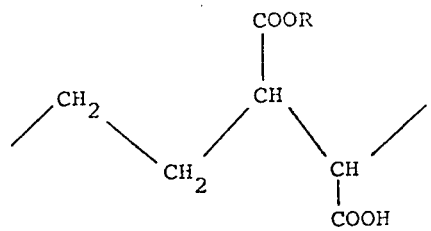

essentially a polyethylene chain with recurrent ethylene and maleic anhydride units the latter reacted to form the half-ester half-acid entity, which is then reacted with a nitrogen base to make it water soluble. More specifically as an example of the resin system, there is used the ammonium salt of the half-ester of the co-polymer of ethylene and maleic anhydride.

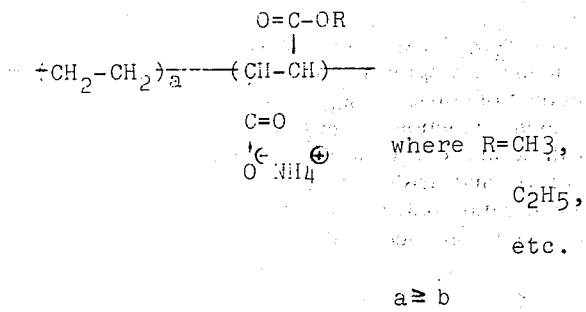

After selecting and obtaining a solution of a polymer of the desired characteristics, properties, and molecular weight, an aqueous dispersion of the polymer is prepared for electrodeposition of the polymer, in accordance with the present invention. Qualitatively speaking, the desired relationship is that, in order to electrodeposit relatively thicker films, the polymer is partially converted to a relatively insoluble state but is maintained as a water reducible dispersion. Such a dispersion is produced by adjusting the ratio of ammoninated carboxyl groups to free carboxyl groups toward the ratio 0.0:1.0, with a pH of about 3.0 to about 6.5. To obtain relatively thinner films the ratio of ammoniated carboxyl groups to free carboxyl groups is adjusted toward the ratio of 1.0:1.0, with a pH of about 10.0 to about 10.5.

The relationship between film Thickness, MOlecular Weight, and Application, is summarized in Table I.

TABLE I

| Thickness | Molecular Weight | Application |
| --- | --- | --- |
| 1. High | Low | Appliances |
| 2. Intermediate | Low | Corrosion resistant coatings |
| 3. Low | Low | Kitchenware |
| 4. High | High | Free standing film |
| 5. Intermediate | High | Motors and transformers |
| 6. Low | High | Motors and transformers |

The advantage of a low molecular weight product is its low viscosity and relative ease in handling.

The specific combination of thickness and molecular weight for a particular coating is determined by the suggested application stated under the heading "Application" in Table I. Generally speaking, however, the low molecular weight and low thickness coatings are provided where there is relatively little flexiblility and there are low temperature requirements such as found in kitchenware. In the high molecular weight range and low thickness films, there is a requirement for flexibility and integrity within the flexed state, this together with the substantial adhesion properties and electrical insulation properties of the high molecular weight—low thickness films indicate their use as insulation coatings for magnet wire.

Referring to FIG. 3, after having obtained the desired molecular weight in the aforedescribed manner, the pH is adjusted by adding a relatively weak volatile acid such as acetic acid, formic acid or the like to the solution, to vary the equivalent ratio of added ammonia ($NH_3$) to carboxyl groups (COOH) of the base polymer from about 0.7 to 1.0 to about 1.0 to 1.0, to the point where all of the ammonia is neutralized, i.e. a ratio of about 0.0 to 1.0 and a pH of 3-6 is obtained, depending on the particular polymer system. Thus, by successively adding greater quantities of acid there is achieved the relationship set forth in Table II. For best results the pH of the electrodepositable dispersion are in the range of about 3.0 to about 6.5. At higher pH values the dispersions fade to solutions of the polymer and thinner coating thicknesses result for a given quantity of coating polymer in the electrodeposit medium. Although dispersions are generally stable at lower pH values, the highly acidic conditions created are generally undesirable for many applications, such as for use with copper and iron substrates. Table II illustrates the $NH_3$/COOH, ratio as a function of the pH of the system:

TABLE II

| Example No. | pH | $NH_3$/COOH |
| --- | --- | --- |
| 14 | 5.6 | 0.00 |
| 11 | 5.8 | 0.28 |
| 4 | 5.9 | 0.16 |
| 5 | 6.0 | 0.42 |
| 9 | 6.0 | 0.34 |
| 2 | 6.0 | 0.42 |
| 10 | 6.7 | 0.60 |
| 3 | 6.8 | 0.68 |
| 8 | 9.2 | 0.84 |
| 1 | 9.6 | 0.95 |
| 12 | 10.1 | 1.20 |

Referring to FIGS. 3, as the ratio of ammonia to carboxyl groups varies from 1.0:1.0 to 0.0:1.0 the thickness of the cured polymer coating formed anodically and under influence of an external electric potential increases from about 0.1 mil to about 2.6 mil. At ratios of about 0.0:1.0 to about 0.3:1.0 ("dispersion" region), there is only a slight change in thickness of electrodeposition with change in ratio of $NH_3$/COOH. In the "metastable" region, from ratios of about 0.3:1.0 to about 0.58:1 $NH_3$COOH, the greatest impact of controllability is obtained. In the metastable region, by carefully adding the acid to the aqueous polymer solution to thereby control the ratio of ammonium ions to carboxylic acid groups in the aqueous-organic polymer medium, it is possible to determine precisely the build-up in thickness of deposit on the anode which will be achieved upon passing an electric current through the aqueous solution-dispersion of metastable material.

In the "solution" region, which occurs with a ratio of $NH_3COOH$ in the order of about 0.6:1.0 to 1.0:1.0, there is so little change in thickness of deposit with change in ratio, that this is generally not a critical region of the curve and changes in thickness of the deposit are negligible. In each instance, changes made in the $NH_3COOH$ ratio, are reflected in the pH, of the medium. It has been observed that the thickness of electrodeposited polymer may be widely varied without affecting the ultimate properties of the deposited coating after it is fully cured. That is to say, the electrodeposited film build-up can be varied, increasing generally from thin to thick, and such build-up can be made gradually adn controllably, and nearly regardless of the extent of molecular weight range, from relatively thin to relatively thick. There will not no noticeable effect on the ultimate properties of the polymer, but is is possible to relaize different physical properties which are a function of the physical thickness of the polyimide and of the molecular weight range of the polymer being deposited.

Ammoniating Compounds

The ammoniating compounds or nitrogen containing bases that are useful in the process of this invention include, ammonia (NHhd 3), ammonium hydroxide ($NH_4OH$), ammonium carbonate [$(NH_4)_3CO_3$], and primary and secondary aliphatic amines containing up to 4 carbon atoms such as methylamine, ethylamine, secondary butylamine, isopropylamine, dimethylamine, diethylamine, dibutylamine, etc.

Acid Addition For Neutralizing The Ammoniated Polymers

Any relatively weak acid, other than carbonic acid, which does not have an effect of creating cleavage of the polymer, and which will have the effect of controlling the equivalent of fixed (acid + anion)/base cation or specifically the ratio of $(COOH+COO^-)/NH_4^+$, can be used. The weak acids which have been found to be useful for neutralizing the ammoniated polymers are the weak organic acids such as acetic acid, formic acid, butyric acid, propionic acid, benzoic, etc.

In order that those skilled in the art may better understand how the inventon may be practiced, the following examples are given by way of illustration and not by way of limitation. All parts are parts by weight unless otherwise expressly set forth.

Electrodepositing Apparatus

The following examples were electrodeposited with the aid of the apparatus of FIG. 2 indicated by reference number 12.

A copper wire anode 14 is submerged in the aqueous solution 16 which is stirred by a magnetic stirring bar 18 activated by the magnetic stirrer 20. Two spectrographic grade 7.5 mm. size carbon electrodes serve as cathodes 22, 24 and are connected by conductors 28, 30 to a D.C. constant power supply 32 with a voltmeter. A milliammeter 36 is connected in series through conductor 33 to the anode 14.

The anode copper wire 14 is degreased, acid cleaned and water rinsed before coating. The aqueous solution is held in an inert container 34 such as glass.

The aqueous composition, current density, voltage, time and anode composition are as stated in the following examples:

I. POLYIMIDE SYSTEMS

EXAMPLE 1.

Referring to FIG. 1A, to a General Electric blender equipped with a dry nitrogen atmosphere was added 130 g. of anhydrous N-methyl-2-pyrrolidone. Then with agitation 16.1 g. of 3,3', 4,4'-benzophenonetetracarboxylic dianhydride was added. To the blender with agitation was then added 10.1 g. p,p'-methylene dianiline over a period of 5 minutes. The maximum temperature during this period was 48°C. After allowing the blender to run for a period of approximately 10 minutes, resulting in a clear solution of the polyorthoamic acid, the percent imidization was calculated from a titration for carboxylic acid content and found to be less than 2% imidized. At this point 10 ml. of conc. ammonium hydroxide was added over a period of one minute with continuous agitation. This was followed by addition of 100 ml. of distilled water with continued agitation for about 5 minutes. The resulting clear poly(ammonium orthoamate) solution was at 10% solids, polyorthoamic acid basis, and absolute viscosity of 350 cps. at 25°C. The ammonia content of the poly(ammonium orthoamate) solution was determined by a titration technique and found to be such that the ratio of the carboxylic acid in the polymer to the ammonium ion was about 1.00/0.95. To 100 g. of the poly-(ammonium orthoamate) solution was added 43 ml. of distilled water and the resulting clear polymer solution employed as an electro-coating solution at 7% solids, polyorthoamic acid basis, to anodically coat a 40 mil copper wire 9 cm. in length in the cell shown and described in FIG. 2. The electrodeposition was conducted by inserting the anode with power off. The power was turned on at a constant voltage and the current read out as a function of time. The power was cut off at 5 seconds and the anode removed from the solution. With voltage maintained constant at 6 v. the current dropped from the initial of 145 ma., to 75 ma., at 5 seconds. The wet film deposit was converted to the polyimide by a cure cycle consisting of about 15 minutes at each of the following temperatures: 100°, 125°, 150°, 200°, 250°C. The film build was 0.6 mil on the diameter for the so-cured, electrodeposited film versus 0.2 mil on the diameter for a similarly cured film formed by a dip and drain application technique with absence of an external electric potential. The coated wires were elongated 25% and found to pass a 2× winding test involving winding on a mandrel having a diameter twice that of the diameter of the wire.

EXAMPLE 2.

To 100 g. of the poly(ammonium orthoamate) of Example 1 at 10% solids was added, dropwise, and with vigorous agitation, a mixture of 20 ml. of a 1.0 N acetic acid and 23 ml. of distilled water. The resulting 7% solids system, polyorthoamic acid basis, was a stable dispersion. The dispersion with a pH = 6.0 and a calc. $COOH/NH_3/NH_4OAc = 38/15/20$, where COOH is of the polymer, $NH_3$ is bound, $NH_4OAc$ is in solution, was employed to anodically coat a 40 mil copper wire 9 cm. in length as per the procedure employed in Example 1 at 6 v. impressed for 5 seconds. The initial current and the drop in current was similar to that in Example 1. Thermal conversion of the adherent electrodeposit to the polyimide resulted in a film build of 1.8 mil on the diameter for the cured electrodeposited film versus 0.2 mil on the diameter for a similarly cured film formed by the dip and drain technique in absence of an external electric potential.

EXAMPLE 3.

To another 100 g. portion of the poly(ammonium orthoamate) prepared in accordance with Example 1 at 10% solids was added, dropwise, and with vigorous agitation, a mixture of 10 ml. of 1.0 N acetic acid and 33 ml. of distilled water. The resulting 7% solids system, polyorthoamic acid basis, was a stable solution. The solution with a pH = 6.8 and a calc. $COOH/NH_3/N-H_4OAc = 38/25/10$ was employed to anodically coat a 40 mil copper wire 9 cm. in length as per the procedure employed in Example 1 at 6 v. impressed for 5 seconds. The initial current as well as the drop in current was similar to that in Examples 1 and 2. Thermal conversion of the adherent electrodeposit to the polyimide resulted in a film build of 1.1 mil on the diameter for the cured electrodeposited film versus 0.2 mil on the diameter for a similarly cured film formed by the dip and drain technique in absence of an external electric potential.

EXAMPLE 4.

To another 100 g. portion of the poly(ammonium orthoamate) prepared in accordance with Example 1 at 10% solids was added, dropwise, and with vigorous agitation, a mixture of 30 ml. of 1.0 N acetic acid and 13 ml. of distilled water. The resulting 7% solids system, polyorthoamic acid basis, was a stable dispersion. The solution with a pH = 5.9 and a calc. $COOH/NH_3/N-H_4OAc = 38/5/30$ was employed to anodically coat a 40 mil copper wire 9 cm. in length as per the procedure employed in Example 1 at 6 v. impressed for 5 seconds. The initial current as well as the drop in current was similar to that in Examples 1–3. Thermal conversion of the adherent electrodeposit to the polyimide resulted in a film build of 2.2 mil on the diameter for the cured electrodeposited film versus 0.15 mil for a similarly cured film formed by the dip and drain technique in absence of an external electric potential. The coated wires were elongated 25% and found to pass the 2× winding test.

The above four examples indicate the ability to control the electrodeposit thickness for a given potential and time by use of a back-titration technique to adjust the effective $COOH/NH_3$ ratio using acetic acid. The following examples illustrate use of other acids.

EXAMPLE 5

To 100 g. of poly(ammonium orthoamate) prepared in accordance with Example 1 at 10% solids was added, dropwise, and with vigorous agitation, a mixture of 20 ml. of 1.0 N formic acid and 23 ml. of distilled water. The resulting 7% solids system, polyorthoamic acid basis, was a stable dispersion. The dispersion with a pH = 6.0 and a calc. $COOH/NH_3/NH_4FOA$ or = 38/15/20 was employed to anodically coat a 40 mil copper wire 9 cm. in length in the cell shown and described in FIG. 2 and as per the procedure employed in Example 1 at 6 v. impressed for 5 seconds. The initial current as well as the current drop was similar to that in Examples 1–4. Thermal conversion of the adherent electrodeposit to the polyimide resulted in a film build of 1.8 on the diameter for the cured electrodeposited film versus 0.15 mil for a similarly cured film formed by the dip and drain technique in absence of an external electric potential.

EXAMPLE 6

To a gas-liquid contact bottle was charged 100 g. of the poly(ammonium orthoamate) prepared in accordance with Example 1 at 10% solids and let down with distilled water to 7% solids. A cylinder of $CO_2$ was connected to the gas inlet and $CO_2$ allowed to trickle through the aqueous solution for several hours. A dispersion could not be created in this manner. The solution remained clear.

From Examples 1–6 it is noted that the acid strength of acetic and formic are sufficient to form the stable dispersion. Carbonic acid is apparently of insufficient acid strength to form the dispersion. Thickness of the electrodeposit as well as properties and nature of the resulting film are affected by other factors such as applied constant voltage, current density, solids level, etc. These factors are taught in the existing art, examples of such variations are therefore omitted.

EXAMPLE 7

Referring to FIG. 1B, 5,320 g. N-methyl-2-pyrrolidone (NMP), predried in a molecular sieve column to <0.02% water, was charged under nitrogen to a reactor equipped with cooling and agitation. Then 695.4 g. 3,3',4,4'-Benzophenonetetracarboxylic dianhydride (BPDA), 2.16 moles at 99.5% purity, was charged and stirred for 2 min. Then 213.2 g. p,p'-methylene dianiline (MDA), 1.08 moles at 99.9% purity, was added with stirring over a period of 5 min. and allowed an additional 15 min. of stirring with temperature controlled at 25°C forming the BMB precursor. Then an additional 218.4 g. MDA, 1.10 moles, was added continuously with stirring over a period of 15 min. with temperature controlled at 40°C max. The resulting polyorthoamic acid, polyimide prepolymer, was then at 17.5% solids and had an inherent viscosity of 0.67 dl./g. measured at C=0.500 dl./g. in NMP at 37.8°C. The percent imidization was found to be 1.5 as determined by titration for the carboxylic acid content in pyridine with tetrabutylammonium hydroxide and thymol blue as the indicator. A molecular weight adjustment was then made by the back-titration technique (see Ser. No. 823,108) adding continuously over a period of 5 min. with stirring 9.6 g. BPDA as a solution in 500 g. NMP, then an additional period of 60 min. with stirring and under nitrogen and at a temperature max. of 40°C. The resulting polyorthoamic acid was at a solids level of 16.3%, imidization level of 1.5%, and inherent viscosity of 0.90 dl./g. To the reactor was then added, under nitrogen and with agitation 0.400 g. of p,p'-methylene dianiline predissolved in 600 g. NMP. This addition was made continuously with stirring over a period of 5 min. and with temperature controlled at 35° ± 3°C. The stirring was continued at temperature for a period of 30 min. The inherent viscosity of this polymer was 0.87 dl./g. measured at C = 0.500 dl./g. in NMP at 37.8°C. The resulting polyorthoamic acid was at 15.0 solids, an absolute viscosity of 3,700 cps. at 25°C, and the imidazation level was found essentially unchanged at 1.5%.

EXAMPLE 8.

To 200 g. of the polymer solution prepared in Example 7 charged to a General Electric blender was added, slowly and with agitation, 9.0 g. (10.0 ml.) conc. ammonium hydroxide solution (28% $NH_3$ by wt.). This was followed by addition, slowly and with agitation, of 100 g. of water. The resulting clear solution had a solids level of 10.0% on the polyorthoamic acid basis and a pH of 9.2. The viscosity of this solution was 525 cps. at 25°C. The ammonia content was determined by placing a sample in 50% by wt. sodium hydroxide in water and heated to boil off water and ammonia. The ammonia was absorbed in 0.1 N HCl and the excess acid titrated with 0.1 N NaOH to a bromthymol blue end point. The ammonia level was found to be $NH_3$/COOH = 1.00/1.18, the COOH/$NH_3$ ratio = 1.00/0.85. To 100 g. of the above solution was added 38 g. of distilled water resulting in a clear solution at 7.2% solids, polyorthoamic acid basis, and a pH = 9.2. This solution was employed as an electrocoating solution to anodically coat a 40 mil copper wire in the cell shown and described in FIG. 2. Electrodeposition was conducted by inserting the copper anode into the solution with power off to a depth of 9 cm. The power was turned on at a constant voltage and the current read out as a function of time. The power was cut off at 5 seconds and the anode removed from the cell. With the voltage maintained constant at 9 v. the current dropped from initial of 180 ma. to 90 ma. at 5 seconds. The wet film deposit was converted to the polyimide by a cure cycle consisting of about 15 min. at each of the following temperatures: 100°, 125°, 150°, 200°, 250°C. The film build was 0.8 mil on the diameter versus 0.2 mil for a similarly cured film formed by dipping and draining a 40 mil copper wire in the same solution in the absence of an external electric potential. The coated wires were elongated 25% and found to pass the 2× winding test.

EXAMPLE 9

To 100 g. of the poly(ammonium orthoamate) prepared as per Example 8 at 10.0% solids, pH = 9.2, and $NH_3$/COOH = 1.00/1.18 was added, slowly and with agitation, a mixture of 19 ml. of a 1.0 N acetic acid solution and 19 ml. of distilled water resulting in a stable dispersion at 7.2% solids, polyorthoamic acid basis, at pH = 6.0 and a calc. COOH/$NH_3$/$NH_4$OAc = 38/13/19. The dispersion was employed to anodically coat a 9 cm. length of 40 mil copper wire using the cell described in FIG. 2 and as per the procedure in Example 8. At a constant voltage of 9 v. the initial current of 200 ma. dropped to 100 ma. in 5 seconds. The wet film deposit was converted to the polyimide with the programmed cure cited in Example 8. The film build was 2.0 mil on the diameter versus 0.2 mil for the polyimide film formed by a dip and drain technique in the absence of an external electric potential. The coated wires passed 2× at 25% elongation.

EXAMPLE 10

To 100 g. of the poly(ammonium orthoamate) prepared as per Example 8 at 10.0% solids, pH = 9.2, and $NH_3$/COOH = 1.00/1.18 was added, slowly and with agitation, a mixture of 9 ml. of 1.0 N acetic acid and 29 ml. of distilled water resulting in a stable solution at 7.2% solids, polyorthoamic acid basis, at pH = 6.7 and a calc. COOH/$NH_3$/$NH_4$OAc = 38/23/9. The dispersion was employed to anodically coat a 9 cm. length of 40 mil copper wire using the cell described in FIG. 2 and as per the procedure in Example 8. At a constant voltage of 9 v. the initial and final current were as per Examples 8 and 9. The film build for the polyimide was 1.2 mil on the diameter versus 0.2 mil for the film formed with a dip and drain technique in absence of the external electric potential. The coated wires passed 2× at 25% elongation.

EXAMPLE 11

To 100 g. of the poly(ammonium orthoamate) prepared as per Example 8 at 10.0% solids, pH = 9.2, and the $NH_3$/COOH = 1.00/1.18 was added, slowly and with agitation, a mixture of 31 ml. 1.0 N acetic acid and 7 ml. distilled water resulting in a stable dispersion at 7.2% solids, polyorthoamic acid basis, at pH = 5.8 and a calc. COOH/$NH_3$/$NH_4$OAc = 38/1/31. The dispersion was employed to anodically coat a 9 cm. length of 40 mil copper wire for 5 seconds at 9 v. using the cell described in FIG. 2 and as per the procedure in Example 8. The initial and final current were as per Examples 8–10. The film build for the polyimide was 2.4 mil on the diameter versus 0.2 mil for the film formed with the dip and drain technique in absence of the external electric potential.

EXAMPLE 12

To 100 g. of the poly(ammonium orthoamate) prepared as per Example 8 at 10.0% solids, pH = 9.2, and $NH_3$/COOH = 1.00/1.18 added, slowly and with agitation, a mixture of 4.5 g. (5.0 ml.) of conc. ammonium hydroxide (28% $NH_3$ by wt.) and 29 ml. of distilled water. The level of ammonia in the polymer was determined as per the technique described in Example 8 and found to be $NH_3$/COOH = 1.20/1.00. The pH of the system was 10.1. The solution at 7.2% solids, polyorthoamic acid basis, was employed to anodically coat a 9 cm. length of 40 mil copper wire using the cell described in FIG. 2 and as per the procedure in Example 8. At a constant voltage of 9 v. the initial and final (5 seconds) currents were not unlike that in Examples 8–10. The film build for the polyimide was 0.6 mil on the diameter versus 0.2 mil for the film formed with the dip and drain technique in absence of the external electric potential. The coated wires passed 2× at 25% elongation.

EXAMPLE 13

To 100 g. of the poly(ammonium orthoamate) prepared as per Example 8 at 10.0% solids, pH = 9.2, and $NH_3$/COOH = 1.00/1.18 was added, slowly and with agitation, 38 ml. of 1.0 N acetic acid. There resulted an unstable dispersion at 7.2% solids, polyorthoamic acid basis, at pH = 5.6 and a calc. COOH/$NH_3$/$NH_4$OAc/HOAc = 38/0/32/6. The dispersion slowly flocculated and settled to the bottom of the beaker as a glob leaving a cloudy supernatent liquor with a pH of 5.6.

EXAMPLE 14

To vigorously agitated 100 g. of the poly(ammonium orthoamate) prepared as per Example 8 at 10.0% solids, pH = 9.2, and $NH_3/COOH = 1.00/1.18$ was added 1.0 ml. of a nonylphenol ethylene oxide adduct wetting agent, dropwise from a syringe. Then, slowly and with agitation, 38 ml. of 1.0 N acetic acid was added. There resulted a stable dispersion at 7.2% solids, polyorthoamic acid basis at pH = 5.6 and a calc. $COOH/NH_3/NH_4OAc/HOAc = 38/0/32/6$. The dispersion was employed to anodically coat a 9 cm. length of 40 mil copper wire for 5 seconds at 9 v. using the cell described in FIG. 1 and as per the procedure in Example 8. The ¾lm build for the polyimide was 2.6 mil on the diameter versus 0.15 mil for the ¾lm formed with the dip and drain technique in absence of the external electric potential.

TABLE III

Summary of Examples

| Ex. No. | pH | System | COOH/NH₃/NH₄OAc/HOAc | Volt. (v) | Film Build (mil) |
|---|---|---|---|---|---|
| 1 | 9.6 | soln. | 38/36/0/0 | 6 | 0.6 |
| 2 | 6.0 | disp. | 38/16/20/0 | 6 | 1.8 |
| 3 | 6.8 | soln. | 38/26/10/0 | 6 | 1.1 |
| 4 | 5.9 | disp. | 38/6/30/0 | 6 | 2.2 |
| 5 | 6.0 | disp. | 38/16/20/0 | 6 | 1.8 |
| 8 | 9.2 | soln. | 38/32/0/0 | 9 | 0.8 |
| 9 | 6.0 | disp. | 38/13/19/0 | 9 | 2.0 |
| 10 | 6.7 | soln. | 38/23/9/0 | 9 | 1.2 |
| 11 | 5.8 | disp. | 38/1/31/0 | 9 | 2.4 |
| 12 | 10.1 | soln. | 38/46/0/0 | 9 | 0.6 |
| *13 | 5.6 | ppt. | 38/0/32/6 | — | — |
| *14 | 5.6 | disp. | 38/0/32/6 | 9 | 2.6 |

*Examples 13 and 14 differed in that composition 14 included 2% of a nonionic wetting agent prior to neutralization with acetic acid.

EXAMPLE 15

400 g. of a polyester formed from a mole ratio of ethylene glycol/dimethylterephthalate/glycerine = 2/3/1 in turn reacted with 3.0 gr. pyromellitic dianhydride was dissolved in 600 g. tetrahydrofurfuryl alcohol at 125°C, cooled to 23°C whereupon it was a semi-solid, reheated to 90°C, cooled to 23°C whereupon a mayonnaise consistency developed and then dispersed with viborous agitation in water at 5° to 20°C and containing 2% of a nonylphenol ethylene oxide adduct wetting agent such that the overall resin solids was at 17% solids. The pH of this system was increased by introducing ammonia and increasing the $NH_3/COOH$ ratio, adding ammonia water to yield pH = 5.1. The system was employed as an electrocoating solution in anodic deposition on 32 mil copper using the cell described in FIG. 2. Applying a current density of 200 ma./cm.$^2$ for 1.0 sec. resulted in a wet film with some integrity. The wire with its electrodeposit was subjected to a stepwise cure schedule of 5 min. at 130°C followed by 5 min. at 225°C. The film build on the disameter was 4.0–4.5 mil versus 0.15 mil for a cured dip and drain film build in absence of an external electric potential.

EXAMPLE 16

A polyester dispersion prepared at 17.2% solids as per Example 15 but with the $NH_3/COOH$ ratio increased resulting in the pH = 6.8 was employed in anodic deposition on 32 mil copper wire at 200 ma./cm.$^2$ for 1.0 sec. and cured as per Example 15. The film build on the diameter was 2.5–3.0 mil versus 0.15 mil for a cured dip and drain film build formed in absence of an external electric potential. An additional cure of 15 min. at 225°C resulted in ability of the coating on wire to withstand 1× flexibility. A cross-section of the wire revealed a concentric film.

EXAMPLE 17

A polyester dispersion prepared at 17.2% solids as per Example 15 but with the $NH_3/COOH$ ratio increased resulting in the pH = 8.8 was employed in anodic deposition on 32 mil copper wire at 200 ma./cm.$^2$ for 1.0 sec. and cured as per Example 15. The film build on the diameter was 1.3–1.6 mil versus 0.15 mil for a cured dip and drain film build formed in the absence of an external electric potential. The film was exposed to an additional cure of 5 min. at 250°C and found to pass 1× flexibility. Other properties of the film included dielectric strength of 3850 v./mil and 1/1 concentricity.

EXAMPLE 18

400 g. of a polyester formed from a mole ratio of ethylene glycol/terephthalic acid/glycerine = 2/3/1 in turn reacted with 1.5 phr pyromellitic dianhydride was dissolved in 600 g. tetrahydrofurfuryl alcohol at 125°C resulting in a clear solution which differed from the polyester in Example 15 in that it remained a solution at 23°C was dispersed with vigorous agitation in water at 5° to 20°C and containing 2% of a nonylphenolethylene oxide adduct wetting agent such that the overall resin solids was 23%. The pH of this system was adjusted by altering the $NH_3/COOH$ ratio by addition of ammonia water. At a pH of 11 the polymer was a clear solution. When employed in the cell described in FIG. 2 to anodically coat 20 cm. of 32 mil copper at 5 v., the initial current of 145 ma. fell to 95 ma. in 2 sec. Exposure to a cure schedule of 5 min. at 150°C and 20 min. at 225°C resulted in a film build of 0.6 mil on the diameter in contrast to a 0.15 mil film build in absence of an external electric potential.

EXAMPLE 19

The polyester of Example 18 at pH = 11 prepared at 22% solids was treated dropwise and with vigorous agitation with 1.0 N acetic acid to decrease the $NH_3/COOH$ ratio and effect the pH = 9.1. There resulted a stable dispersion at pH = 9.1 which was employed in the cell of FIG. 2 to anodically coat 32 mil copper 20 cm. in length. The wire was immersed with power off. Then with power on at a constant potential of 5 v. the initial current read out at 170 ma. which fell to 125 ma. in 2 sec. The electrodeposited film on the wire was given a cure schedule of 5 min. at 150°C and 20 min. at 225°C. There resulted a 1.2 mil film build on the diameter versus sa 0.2 mil build from a dip and drain coat formed in absence of an external electric potential.

EXAMPLE 20

The polyester of Example 18 was treated with acetic acid as per Example 19 to effect an overall greater decrease in the $NH_3/COOH$ ratio resulting in a pH of 8.3. This solution was used to anodically coat a 32 mil 20 cm. length of copper as per Example 19 at 5 v. The initial and final current were approximately as per Example 19, 165 ma. dropping to 130 ma., respectively. The film build for the cured enamel was 1.5 mil on the diameter. The film on wire passed 1× flexibility.

EXAMPLE 21

The polyester of Example 18 was treated with acetic acid as per Example 19 to effect a $NH_3/COOH$ ratio which exhibited a pH of 7.8. This solution anodically deposited on copper as per Examples 18–20 at 5 v. resulted in an initial current of 165 ma. which fell to 130 ma. in 2 sec. and a cured film build of 2.4 mil on the diameter versus 0.15 mil in the absence of an external electric potential.

EXAMPLE 22

400 g. of a polyester formed from a mole ratio of ethylene glycol/dimethylterephthalate/glycerine = 2/3/1 in turn reacted with 0.7 gr. pyromellitic dianhydride was dissolved in 600 g. of tetrahydrofurfuryl alcohol at 125°C, cooled to 23°C, reheated to 90°C, cooled to 23°C and then dispersed in water containing 2% of a nonionic wetting agent with vigorous agitation at 5°–10°C such that the overall solids was at 17%. The pH of this system was increased by introducing ammonia and increasing the $NH_3/COOH$ ratio, adding ammonia water to yield pH = 9.1. The dispersion was employed in the cell shown in FIG. 2 to anodically coat 32 mil aluminum wire. Using an initial current density of 17 ma./cm.$^2$ there resulted a current density of 13 ma./cm.$^2$ after 3 seconds and a cured film build of 0.5 mil on the diameter versus 0.15 mil for a film formed in absence of an external electric potential. After exposure to the cure schedule of 5 min. at 150°C and 15 min. at 250°C the film on wire passed 1× flexibility.

EXAMPLE 23

The polyester of Example 22 was adjusted with 1.0 N acetic acid to an $NH_3/COOH$ ratio which exhibited a pH = 7.3 and resulted in a stable dispersion. Using an initial current density of 17 ma./cm.$^2$ there resulted a current density of 13 ma./cm.$^2$ after 3 seconds and a cured film build at 1.5–1.6 mil on the diameter versus 0.15 mil for a film formed in absence of an external electric potential. Application of the cure schedule of Example 22 resulted in a film which passed 1× flexibility.

III. POLYESTERIMIDE SYSTEM

EXAMPLE 24

400 g. of a polyesterimide formed from a mole ratio of ethylene glycol/trishydroxyethylisocyanurate/- terephthalic acid/reaction product of 2 moles trimellitic anhydride and one mole methylene dianiline = 2/1/1/2 was dissolved in tetrahydrofurfuryl alcohol at 130°C resulting in a clear solution which remained a solution at 23°C. The solution was dispersed with vigorous agitation in water at 5°–10°C containing 2% of a nonylphenol-ethylene oxide adduct wetting agent and ammonia such that the resulting $NH_3/COOH$ ratio exhibited a system pH = 9.1. The system at a 25% solids level was employed in the cell shown in FIG. 2 to anodically coat a 20 cm. length of 32 mil copper. At a constant potential of 5 v. there was an initial current of 150 ma. which decreased to 95 ma. in 2 seconds. The electrodeposit was exposed to a cure schedule of 5 min. at 150°C and 15 min. at 240°C. The film build was 1.3 mil on the diameter and passed 1× flexibility.

EXAMPLE 25

The polyesterimide of Example 24 was treated with 1.0 N acetic acid to decrease the $NH_3/COOH$ ratio on the polymer such that the pH was decreased from 9.1 to 7.3. The dispersion electrodeposited at a constant potential of 5 v. on wire as per Example 24 exhibited a current drop from 140 to 90 ma. in 2 seconds and had a film build of 2.9 mil on the diameter. The cured film exhibited good concentricity on a cross-section and passed 1× flexibility.

IV. HEAD TO HEAD POLYACRYLIC SYSTEM

EXAMPLE 26

To a reaction vessel equipped with stirring and controlled atmosphere and containing 37.0 ml. of conc. ammonia water (28.0% ammonia by wt.) diluted with 480 ml. of distilled water was added, slowly and with stirring, 79.0 g. of the methyl half-ester of a copolymer of ethylene and maleic anhydride in the mol. wt. range of 25,000. There resulted a clear solution at 15.8% solids by wt. having an $NH_3/COOH$ equivalent ratio of 0.95/1.00 and a pH of 8.5. To 50.0 ml. of the polymer solution was added 50.0 ml. of distilled water resulting in a solids level of 7.9% which was employed in electrocoating. The apparatus of FIG. 2 was employed to anodically coat a 40 mil copper wire submerged to a depth of 9 cm. Using a constaant potential of 10 v. the current initially at 60 ma. read out at 45 ma. at 5 seconds and provided a film build of the dried electrodeposit of 0.4 mil on the diameter, compared with a build of 0.1–0.2 mil in the absence of the external electric potential.

EXAMPLE 27

The $NH_3/COOH$ ratio of the polymer in 50.0 ml. of the system of Example 26 at 15.8% solids was adjusted by addition with stirring of 50.0 mil of 0.5 N acetic acid resulting in a stable solution providing an $NH_3/COOH$ ratio in the polymer of approx. 0.5/1.0 and a pH of 6.2. The apparatus of FIG. 2 was employed to anodically coat a 40 mil copper wire submerged to a depth of 9 cm. At a potential of 10 v. the initial current of 60 ma. was at 45 ma. at 5 seconds and provided a film build of the dried electrodeposit of 0.6 mil on the diameter, compared with a build of 0.1–0.2 mil in the absence of the external electric potential.

EXAMPLE 28

The $NH_3/COOH$ level of the polymer in 50.0 ml. of the system of Example 26 at 15.8% solids was adjusted by addition with stirring of 50 ml. of 1.0 N acetic acid resulting in a stable dispersion and providing an $NH_3/COOH$ ratio in the polymer of approx. 0/1 and a pH of 5.0. The apparatus of FIG. 2 was employed to anodically coat a 40 mil copper wire submerged to a depth of 9 cm. At a potential of 10 v. the current initially at 60 ma. read out at 45 ma. at 5 seconds and provided a film build of the dried electrodeposit of 1.0 mil on the diameter compared with a build of 0.1–0.2 mil in the absence of the external electric potential.

When the time at constant voltage in the electrodeposition of solutions and dispersions of Examples 26–28 was extended, there resulted correspondingly larger builds in each instance with the final current remaining about constant over a doubling and tripling of the time period. For example, film builds obtained in 10 seconds were found to be 1.6 mil for the dispersion of Example 28, 0.8 mil for the solution of Example 27 and 0.6 mil for the solution of Example 26. Likewise, variation in the voltage plays a role in film build obtained and also in performance properties of the dried electrodeposited film. A balance of voltage, current, time, and polymer solids level of the solution or dispersion must be determined for a given metal substrate with the end product in mind. Such balance is readily determinable by experiment by those familiar with the art. It is to that art which the present teaching extends the control of film build for a given polymer by control of the $NH_3/COOH$ ratio using volatile base and acid additives illustrated in the above examples, controlling film build from the polymer in solution in "one pass" and without altering the properties the particular polymer can exhibit.

In each of the Examples the electrodeposition is derived principally from the dispersed phase of resinous material. Inevitably some of the solution phase resinous material will also be deposited, but this is only incidental. The basic discovery of this invention is to utilize the dispersion of particles as the source of the coating and it is to this phase that I rely in achieving the improved results. Hence, I carefully adjust the value of pH to assure that a dispersion will occur and to the degree that the electrocoating is derived principally from such dispersion source. Also, I adjust the voltages, which necessarily vary as well-known to those skilled in this art to attain an electrodeposition from the dispersion phase, primarily, as distinguished from electrocoatings derived from solution phase resin. This latter factor is not capable of ready quantification since it will vary with resin system and pH. Nevertheless, it is a factor and a significant one to regard in the practice of this invention.

Obviously excessive voltages are avoided to circumvent the difficulties described since during electrocoating the higher voltages tend to electrodeposit from the solution phase as contrasted to the dispersed phase resin and thus hinder the very results which are characteristic of this invention.

CONCLUSION

By forming a resin system having reactable pendant carboxylic groups on a relatively small molecular chain unit, such carboxylic groups being repeated along the length/$NH_4^+$ of the moderate, and reacting the carboxylic groups with a nitrogen containing base. I can make the polymer water soluble. Water is then added to the system so that there is a combination organic/water solvent system. The ratio of $[COOH + COO^-]/NH^+_4$ is then adjusted by acid titration with a relatively weak acid to preferentially render the polymer insoluble, and there is produced a bi-phase of insoluble dispersion and solution of polymer. The discovery is that the amount of dispersion is regulatable by the simple expedient of acid addition and the amount of dispersion controls the electrodepositability of the resin and I can achieve much greater thickness of electrodeposition. By the term dispersion as employed herein, the term is given its ordinary meaning to include a suspension of particles within the liquid continuous phase of organic and water solvent. The improved coatings are derived in principal part from dispersed phase polymer.

While I have emphasized the applicability of my coating process to the production of magnet wire insulation enamels, it will be appreciated that my invention is also useful in many other areas. For example, the films formed in accordance to my invention may find use in all high temperature insulation applications. For example stator and rotor slot insulators, transformers, cable casings, capacitors, and for various laminating processes. In each case the coating process will provide a low-cost, highclass insulator or bonding agent that can be used in place of existing materials. Other potential uses of my coating process of forming water-borne coating solutions with or without minon modifications, will occur to those skilled in the art, and I intend, therefore, in the following claims, to cover all such equivalent variations as fall within the true spirit and scope of this invention.

What I claim as new and desire to secure by Letters Patent of the United States is:

1. A process of producing a polymer coating on a conductive substrate, including the steps of:
    reacting, in an inert water-miscible, organic solvent,
        a curable polymer having recurrent reactive carboxyl groups, and
        a volatile ammoniating agent, to form a water-soluble ammonium carboxylate salt of said polymer, and
    adding sufficient water to said organic solution of said ammonium carboxylate polymer salt to form an aqueous-organic solution of said salt;
  wherein the improvement comprises
    adding a volatile weak acid to said aqueous-organic solution in an amount sufficient to precipitate at least a portion of said polymer as a stable dispersion without breaking the chain linkages of said polymer thereby to form both a dispersion phase and a solution phase of said polymer in an aqueous-organic liquid medium,
    immersing a conductive substrate in said aqueous-organic liquid medium, and
    applying a voltage to said medium and substrate sufficient to electrodeposit a polymer coating from said medium onto said substrate to a thickness of between about 1.0 and about 2.6 mils.

2. A process as defined in claim 1 wherein said polymer is selected from the group consisting of polyamic acid prepolymers, polyesters, polyesterimides, and copolymers of alkenes with unsaturated polycarboxylic acids.

3. A process as defined in claim 1 wherein said volatile ammoniating agent is selected from the group consisting of ammonia, ammonium hydroxide, ammonium carbonate, primary and secondary amines containing up to four carbon atoms, and mixtures thereof.

4. A process as defined in claim 1 wherein said volatile weak acid is a volatile weak organic acid.

5. A process as defined in claim 4 wherein said volatile weak organic acid is selected from the group consisting of acetic acid, formic acid, butyric acid, propionic acid, benzoic acid, and mixtures thereof.

6. A process as defined in claim 1 wherein the improvement further comprises the step of adding water to said aqueous-organic solution during the addition of said volatile weak acid to adjust the ratio of organic solvent to water to provide a stable dispersion of polymer in predetermined proportion to the amount of polymer contained in solution.

7. A process as defined in claim 1 including the step of adding a wetting agent to the organic solvent polymer salt solution.

8. A process as defined in claim 7 wherein the wetting agent is a nonylphenol-ethylene oxide adduct wetting agent.

9. A substrate having a polymer coating produced thereon by the process defined in claim 1.

10. A process of producing a polyamide acid polymer coating on a conductive substrate, including the steps of:
reacting in an inert water-miscible organic solvent,
a curable polyamide acid polymer having recurrent reactive carboxyl groups, and
a volatile ammoniating agent selected from the group consisting of ammonia, ammonium hydroxide, ammonium carbonate, primary and secondary amines containing up to four carbon atoms, and mixtures thereof,
to form an organic solvent solution of an ammonium carboxylate polymer; and
adding sufficient water to said organic solvent solution of an ammonium carboxylate polymer salt to form an aqueous-organic solvent solution of said salt;
wherein the improvement comprises
adding a volatile weak water-soluble mono-basic acid selected from the group consisting of acetic acid, formic acid, butyric acid, propionic acid, benzoic acid, and mixtures thereof, to said aqueous-organic solvent solution of said ammonium carboxylate polymer salt, in an amount sufficient to provide a pH range of 3.0–6.5 and precipitate at least a portion of said polymer as a stable dispersion without breaking the chain linkages of said polymer; the amount of polymer, water, organic solvent and acid being in proportions sufficient to provide both a solution phase and a stable dispersion phase of said polymer in an aqueous-organic liquid medium having a total polymer content of between about 7% and about 25% solids by weight,
immersing a conductive substrate in said aqueous-organic medium, and
applying a voltage to said medium and substrate sufficient to electrodeposit a polymer coating from said medium onto said substrate to a thickness of between about 1.0 and about 2.6 mils.

11. A process as defined in claim 10 wherein the improvement further comprises the step of adding water to said aqueous-organic solution of said salt during the addition of said volatile weak acid to adjust the ratio of organic solvent to water to provide a stable dispersion of polymer in predetermined porportion to the amount of polymer contained in solution.

12. A process as defined in claim 10 wherein the polymer is partially imidized prior to reaction with said volatile ammoniating agent.

13. A process as defined in claim 10 wherein the polymer is derived as the reaction product of an aromatic tetracarboxylic dianhydride and an aromatic diamine.

14. A process as defined in claim 13 wherein the polymer is the reaction product of 3,3',4,4'-benzophenonetetracarboxylic dianhydride and p,p'-methylene dianiline and the organic solvent is N-methyl-2-pyrrolidone.

15. A process as defined in claim 10 wherein the organic acid is selected from formic acid and acetic acid.

16. The process as defined in claim 10 including the step of adding a nonionic wetting agent to the organic solvent polymer salt solution.

17. A process as defined in claim 16 wherein the wetting agent is a nonylphenol ethylene oxide adduct.

18. A process as defined in claim 10 wherein the polyamic acid prepolymer is derived from an aromatic dianhydride and a di-primary amine of the formula $NH_2$-$R'$-$NH_2$, wherein $R'$ is a divalent radical selected from the class consisting of

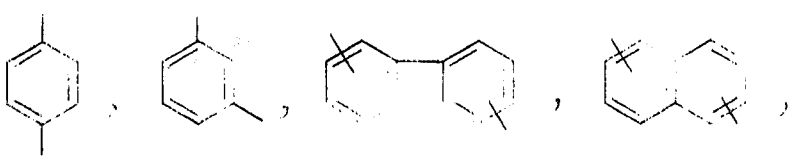

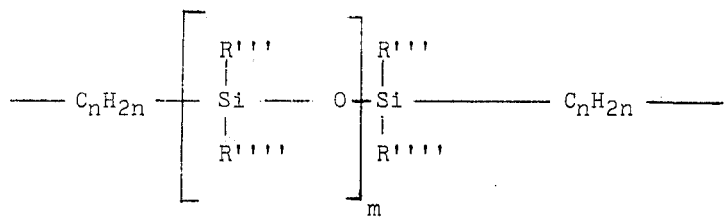

wherein R''' and R'''' are an alkyl and an aryl group having 1 to 6 carbon atoms, n is an integer of from 1 to 4 and m has a value of 0, 1 or more, and

wherein R'' is selected from the group consisting of an alkylene chain having 1–3 carbon atoms,

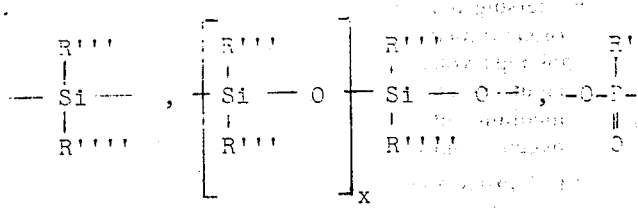

—O—, —S—, —SO₂—, and

wherein R''' and R'''' are as above-defined and x is an integer of at least 0.

19. A process as defined in claim 10 wherein the improvement further comprises the step of curing the electrodeposited polymer film at a temperature above 50° C.

20. A substrate having a polymer coating produced thereon by the process defined in claim 19.

21. A substrate having a polymer coating produced thereon by the process defined in claim 10.

22. A process of electrodepositing a polyamide acid polymer coating on a conductive substrate, including the steps of:
   forming a solution of polyamide acid polymer comprising the reaction product of 3,3'4,4'-benzophenonetetracarboxylic dianhydride and p,p'-methylene dianiline in anhydrous N-methyl-2-pyrrolidone, said polymer containing reactive carboxyl groups and being less than 2% imidized,
   reacting said polyamide acid polymer in said solution with ammonium hydroxide in proportions of polymer and ammonium hydroxide sufficient to form a water-soluble ammonium carboxylate salt of said polymer wherein the ratio of ammonium ions to polymer carboxyl groups and is between about 0.3 and about 0.84, and
   adding sufficient water to said N-methyl-2-pyrollidone solvent solution of said ammonium carboxylate polymer salt to form an aqueous-organic solvent solution of said salt having a polymer solids content of about 10% to about 15% solids by weight;
wherein the improvement comprises
   adding 1.0 N aqueous acetic acid to said aqueous-organic solution of said ammonium carboxylate polymer salt, in an amount sufficient to provide a pH of the range of 3.0 to 8.5 and precipitate at least a portion of said polymer as a stable dispersion without breaking the chain linkages of said polymer; the amount of polymer, water, organic solvent and acid being in proportions sufficient to provide both a solution phase and a stable dispersion phase of said polymer in an aqueous-organic medium having a total polymer content of between about 7% and about 25% solids by weight,
   immersing a conductive substrate in said aqueous-organic medium, and
   applying a voltage to said medium and substrate sufficient to electrodeposit a polymer coating from said medium onto said substrate to a thickness of between about 1.0 and about 2.6 mils.

23. A substrate having a polymer coating produced thereon by the process defined in claim 22.

* * * * *

UNITED STATES PATENT OFFICE
CERTIFICATE OF CORRECTION

PATENT NO. : 3,892,647
DATED : July 1, 1975
INVENTOR(S) : Marvin A. Peterson

It is certified that error appears in the above-identified patent and that said Letters Patent are hereby corrected as shown below:

```
Col.  1, line 19, delete "were" and insert --wire--;
         line 40, delete "produce" and insert --product--;
         line 40, delete "relative" and insert --reactive--;
         line 51, delete "prefetermined" and insert --predeter-
                  mined--.
Col.  2, line 54, delete "ammo-";
         line 55, delete "niating" and insert --invention--.
Col.  3, line 40, delete "," and insert --;--.
Col.  5, line 25, delete "gneral" and insert --general--;
         line 65, delete "XYY" and insert --XYX--.
Col.  6, line 17, delete "encapped" and insert --endcapped--;
         line 18, delete "1971" and insert --1972--.
Col.  7, line  2, delete "selecetd" and insert --selected--;
         line  4, after "of" insert the following:
```

--2 to 6, (2)  , and (3) 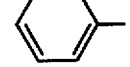 ,

R' is $-(CH_2)_n-$ where n is preferably within the value range of 2 to 6, and R'' is selected from (1) $-(CH_2)_n-$ where n is preferably within the value range of--.

```
Col.  9, line 30, delete "R-" and insert --R''--.
Col. 10, line 24, delete "corsslinkable" and insert --crosslink-
                  able--.
Col. 11, line 47, delete "ammoninated" and insert --ammoniated--;
         line 55, delete "MOlecular" and insert --Molecular--.
Col. 12, line 29, after "results" insert --,--;
         line 31, after "values" insert --,--;
         line 38, after "the" insert --ratio--;
```

Page 2

UNITED STATES PATENT OFFICE
CERTIFICATE OF CORRECTION

PATENT NO. : 3,892,647
DATED : July 1, 1975
INVENTOR(S) : Marvin A. Peterson

It is certified that error appears in the above-identified patent and that said Letters Patent are hereby corrected as shown below:

Col. 12, line 39, delete "ratio";
line 57, delete "FIGS." and insert --FIG.--;
line 66, delete "$NH_3COOH$" and insert --$NH_3/COOH$--;
line 67, delete "metastable" and insert --"metastable"--.
Col. 13, line 6, delete "metastable" and insert --"metastable"--;
line 8, delete "$NH_3COOH$" and insert --$NH_3/COOH$--;
line 12, delete "$NH_3COOH$" and insert --$NH_3/COOH$--;
line 20, delete "adn" and insert --and--;
line 22, delete "not" and insert --no--;
line 24, delete "relaize" and insert --realize--;
line 32, delete "(NHhd 3)" and insert --($NH_3$)--;
line 33, delete "$[NH_4)_3CO_3]$" and insert --$[(NH_4)_2CO_3]$--;
line 61, delete "number" and insert --numeral--.
Col. 19, line 18, delete "3/4lm" and insert --film--;
line 20, delete "3/4lm" and insert --film--;
line 51, insert before heading "EXAMPLE 15" the heading --II. POLYESTER SYSTEM--;
line 61, delete "viborous" and insert --vigorous--.
Col. 20, line 7, delete "disameter" and insert --diameter--.
Col. 21, line 6, delete "sa" and insert --a--.
Col. 22, line 45, delete "constaant" and insert --constant--.
Col. 23, line 64, delete "/$NH_4$+ of the moderate" and insert --of the molecule--;
line 65, delete "." and insert --,--;
line 66, delete "Ican" and insert --I can--.
Col. 24, line 11, delete "dispersion" and insert --"dispersion"--;
line 28, delete "minon" and insert --minor--.
Col. 25, line 39, after "polymer" insert --salt--.

Signed and Sealed this twenty-seventh Day of January 1976

[SEAL]

Attest:

RUTH C. MASON
Attesting Officer

C. MARSHALL DANN
Commissioner of Patents and Trademarks